United States Patent [19]

Maters et al.

[11] Patent Number: 5,100,966
[45] Date of Patent: Mar. 31, 1992

[54] WATER-DILUTABLE, CROSSLINKABLE BINDER RESIN

[75] Inventors: Gerardus J. W. M. Maters, Er Bergen Op Zoom; Tamme Bartels, Xn Vaassen, both of Netherlands

[73] Assignee: Akzo NV, Arnhem, Netherlands

[21] Appl. No.: 390,593

[22] Filed: Aug. 7, 1989

[30] Foreign Application Priority Data

Aug. 9, 1988 [NL] Netherlands ............... 8801980

[51] Int. Cl.$^5$ .................. C08F 220/32; C09D 133/10
[52] U.S. Cl. .................... 525/286; 525/285; 525/298; 525/327.3; 525/330.5; 106/14.13; 106/287.25
[58] Field of Search ............... 525/286, 298

[56] References Cited

U.S. PATENT DOCUMENTS

| | | | |
|---|---|---|---|
| 2,759,913 | 8/1956 | Hulse | 260/89.7 |
| 3,541,055 | 11/1970 | Malamet et al. | 525/286 |
| 3,840,390 | 10/1974 | Kozu et al. | 117/93.31 |
| 3,919,347 | 11/1975 | Katsimbas | 525/286 |
| 4,037,038 | 7/1977 | Tsuchiya | 526/56 |
| 4,251,597 | 2/1981 | Emmons et al. | 428/500 |
| 4,304,701 | 12/1981 | Das et al. | 525/286 |
| 4,571,420 | 2/1986 | Marks | 525/350 |
| 4,602,061 | 7/1986 | Akkerman | 525/10 |
| 4,871,806 | 10/1989 | Shalati et al. | 525/286 |
| 4,990,577 | 2/1991 | Noomen et al. | 525/454 |

FOREIGN PATENT DOCUMENTS

| | | | |
|---|---|---|---|
| 0053740 | 6/1982 | European Pat. Off. | 525/286 |
| 0099207 | 1/1984 | European Pat. Off. | |
| 0203296 | 12/1986 | European Pat. Off. | |
| 0262720 | 4/1988 | European Pat. Off. | |
| 1955271 | 4/1969 | Fed. Rep. of Germany | 3/80 |
| 1227398 | 4/1971 | United Kingdom | |
| 1228040 | 4/1971 | United Kingdom | |

OTHER PUBLICATIONS

Jerry March, Advanced Organic Chemistry, Reactions, Mechanisms and Structure, Third Ed., 1985, pp. 664–713.

Primary Examiner—John C. Bleutge
Assistant Examiner—Vasu S. Jagannathan
Attorney, Agent, or Firm—James K. Poole; Louis A. Morris

[57] ABSTRACT

The present invention pertains to a crosslinkable binder resin comprising an acrylate copolymer backbone having as pendant groups water soluble half esters of dicarboxylic acid and crosslinkable olefinic groups which contain an activated ethylenic unsaturation, such as (meth)acryloyl groups. The (meth)acryloyl groups can be crosslinked by polyfunctional crosslinking agents such as amino or blocked amino crosslinkers. The water-soluble half esters preferably are formed by the reaction of pendant hydroxy groups with unsaturated cyclic anhydrides (the unsaturation providing an additional crosslinking site). The (meth)acryloyl groups preferably are formed by the reaction of pendant epoxy groups with (meth)acrylic acid or derivatives thereof.

9 Claims, No Drawings

WATER-DILUTABLE, CROSSLINKABLE BINDER RESIN

The present application for patent is entitled to the benefit of an earlier filing date in a foreign country under 35 U.S.C. 119, based on priority application Ser. No. 8801980, The Netherlands, filed Sept. 8, 1989 which is hereby incorporated by reference.

BACKGROUND OF THE INVENTION

1. Field of the Invention

The present invention relates to a water-dilutable, crosslinkable binder comprised of an acrylate copolymer having as pendant groups water-soluble, half esters of dicarboxylic acid and olefinic groups which can be crosslinked.

2. Background of the Invention

Coating compositions, glues and inks generally contain a binder polymer which can be dried and/or cured to provide a film. Frequently the binder polymer includes reactive groups which are crosslinked during the cure of the composition, to provide an insoluble polymer film.

GB Patent Specification 1,228,040, having a priority date of Aug. 28, 1967, describes a crosslinkable lacquer resin and a process for production thereof. The resin consists of the reaction product of (A) A copolymer of ethylenically unsaturated monomers, one of which contains an epoxy group,
(B) an aliphatic hydroxycarboxylic acid, and
(C) a cyclic anhydride of a dicarboxylic acid.

Reactant (A) is reacted with reactant (B), wherein the carboxyl group of the hydroxycarboxylic acid reacts with the epoxy groups contained in the copolymer. Subsequently reactant (C) is reacted with the hydroxyl groups which are present due to the addition of the hydrocarboxylic acid to the epoxy groups containing copolymers.

The product produced is said to be surprisingly compatible with aminoplasts, enabling the production of highly concentrated laquer (solvent-based) solutions of relatively low viscosity.

GB Patent Specification 1,227,398, having a priority dated Aug. 16, 1967, discloses air-drying lacquers based on vinyl resins. They are prepared by reacting a copolymer of ethylenically unsaturated monomers, one of which contains an epoxy group, with a drying fatty acid in the presence of a solvent. The fatty acids are linked to the epoxy groups. Subsequently a dicarboxylic acid anhydride is added, which essentially reacts with the hydroxyl groups which originate from the epoxy groups.

U.S. Pat. No. 4,037,038, issued July 19, 1977 (priority filed in Japan on Aug. 5, 1975), describes a resin suitable as a coating material, which resin consists essentially of a reaction product of (1) a copolymer of a cyclopentadiene type compound and at least one $\alpha,\beta$ unsaturated monomer, with
(2) acrylic acid and/or methacrylic acid.

The $\alpha,\beta$ unsaturated monomer is selected from the group consisting of hydroxy (meth)acrylates, glycidyl (meth)acrylates, allyl glycidyl ether and methallyl glycidyl ether.

The product produced is particularly recommended for use in solvent-free printing inks.

A polymer binder of the type which comprises acrylate copolymers having crosslinkable pendant groups is described in European Patent Specification 0 099 207. For the type of binder polymer described therein, the crosslinkable pendant olefinic groups must not exceed a the degree of reactivity defined in the specification (since otherwise the crosslinking reaction in the presence of radicals will proceed in an uncontrolled manner).

The polymer binder described in European Patent Specification 0 099 207 includes olefinic groups which are, in particular, allyl groups and vinyl groups, such as allyl itaconate or vinyl itaconate. With such pendant crosslinkable groups, the known binders are of the following formula $$(CH_2-CR^1-)_a(CH_2-CR^1)_d(CH_2-CR^1)_b(CH_2-\underset{\underset{CO_2R^4}{|}}{CR^1})_e$$
$$\underset{CO_2R^2}{|} \quad \underset{CO_2R}{|} \quad \underset{CO_2(CH_2)_cO_2C-CH_2\underset{\underset{CH_2}{\|}}{C}-CO_2CH=CH_2}{|}$$

$$(CH_2-CR^{1})_a(CH_2-CR^1)_d(CH_2-CR^1)_b-(CH_2-\underset{\underset{CO_2R^4}{|}}{CR^1})_e$$
$$\underset{CO_2R^2}{|} \quad \underset{CO_2R}{|} \quad CO_2(CH_2)_cO_2C-\underset{\underset{CH_2}{\|}}{C}-CH_2CO_2R^3$$

wherein
$R^1$ is H or $CH_3$
$R^2$ is $C_1$ to $C_5$ alkyl
$R^3$ is vinyl or allyl
$R^4$ is $C_1$ to $C_5$ hydroxyalkyl
R is the half ester of a dicarboxylic acid capable of forming cyclic anhydride
a is 10 to 100
b is 0.1a to a
c is 1 to 5
d is 0.1b to b
e is 0 to b Crosslinking of the polymers of the type described in the above-referenced patent specification is carried out with a catalyst such as a cobalt salt under the influence of oxygen from the air.

At present there is much interest in two-component water-dilutable systems based on acrylate copolymers of the kind described above. However, it is desired to use polyfunctional crosslinking agents which enter into an addition reaction with the olefinic pendant groups rather than crosslinking catalysts such as cobalt salts, which do not enter into the addition reaction, since favourable solvent resistance, hardness, and scratch resistance are more readily obtained with such polyfunctional crosslinking agents than with the conventional systems cured using metallic salts under the influence of oxygen.

The present invention therefore has for its object to provide a water-dilutable binder that may be cured with polyfunctional crosslinking agents.

SUMMARY OF THE INVENTION

In accordance with the present invention, the crosslinkable binder resin is comprised of an acrylate copolymer having as pendant groups water soluble half esters of a dicarboxylic acid and crosslinkable olefinic groups which contain an activated ethylenic unsaturation, whereby the olefinic groups can be crosslinked using polyfunctional, crosslinking agents.

The preferred method of synthesis of the (meth)acryloyl groups is via reacting (meth)acrylate polymers which have pendant epoxy groups with (meth)acrylic acid or derivatives thereof.

The crosslinkable acrylic copolymer of the present invention can be prepared from, for example, (1) 5-70% by weight of one or more epoxy group-containing (meth)acrylate compounds
(2) 3-30% by weight of one or more hydroxy-functional (meth)acrylate compounds, and
(3) 0-92% by weight of one or more monomers copolymerizable with (a) and (b)

wherein, subsequent to polymerization of the copolymer of reactants (1), (2) and (3), at least a portion of the pendant epoxy groups is converted to (meth)acryloyl groups using (meth)acrylic acid or a derivative thereof, and, wherein at least a portion of the pendant hydroxyl groups present due to the reaction of the hydroxy-functional (meth)acrylate compounds of (2) is converted to water-soluble half esters.

The (meth)acrylic acid, or derivative thereof, will typically have the following structural formula:

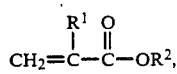

wherein $R^1 =$ H or $CH_3$, and

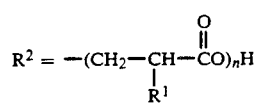

Acrylic acid is especially suitable for conversion of the epoxy groups, since its use results in the highest curing reaction rate (because of the absence of a substituent at the α-position). Acrylic acid derivatives substituted at the α-position exhibit a much lower reactivity.

The water-soluble half esters are formed by reacting the pendant hydroxyl-groups formed from the hydroxy-functional (meth)acrylate compounds of (b) with a saturated or unsaturated cyclic anhydride.

DETAILED DESCRIPTION OF THE PREFERRED EMBODIMENTS

Although the following description of the preferred embodiments is limited to cases wherein the crosslinkable olefinic groups are (meth)acryloyl groups, it is intended that the scope of the invention include other functional groups exhibiting activated ethylenic unsaturation.

In accordance with the preferred embodiment of the present invention, a crosslinkable binder resin comprising an acrylate copolymer having as pendant groups water-soluble half esters of a dicarboxylic acid, and crosslinkable, activated, ethylenically unsaturated (meth)acryloyl groups is prepared by reacting (1) 5-70% by weight of one or more epoxy group-containing (meth)acrylate compounds,
(2) 3-30% by weight of one or more hydroxy-functional (meth)acrylate compounds, and
(3) 0-92% by weight of one or more monomers copolymerizable with (1) and (2).

Subsequent to the above reaction, at least a portion of the pendant epoxy groups is converted to (meth)acryloyl groups using (meth)acrylic acid or a derivative thereof; and at least a portion of the hydroxy groups present from the earlier reaction of the hydroxy-functional (meth)acrylate compounds are converted to a half ester.

The pendant (meth)acryloyl groups formed typically have the following formula:

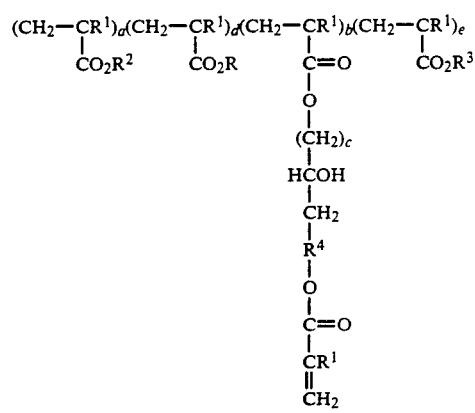

Or, the (meth)acrylic acid can also react with the other carbon of the epoxy group, in which case the following pendant acryloyl groups will be formed.

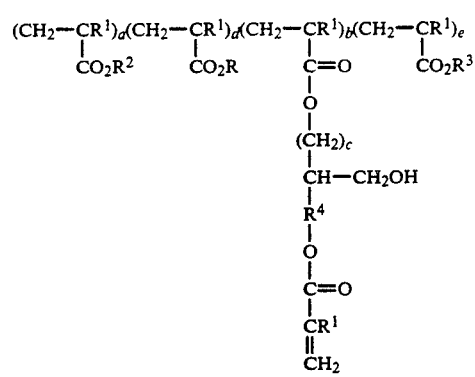

wherein
R is half ester of dicarboxylic acid capable of forming cyclic anhydride
$R^1$ is H or $CH_3$
$R^2$ is $C_1$-$C_{18}$
$R^3$ is $C_1$-$C_5$ hydroxylalkyl
$R^4$ is

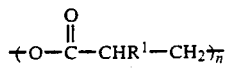

with n=0-2
a is 5-10
b is 2-60
c is 1-5
d is 0.2-60
e is 0-30

Combinations of both kinds of pendant group (meth-)acryloyl structure will typically occur in the water-crosslinkable binder resin.

Of course, the acrylate copolymer may also contain different copolymerizable monomers, such as styrene. For clarity, these have not been included in the above formula.

The esterification reaction of the epoxy groups-containing polymer with the (meth)acrylic acid (derivatives) is carried out over a temperature range from about 60°–140° C., but proceeds most favourably over a temperature range from about 80°–120° C. The reaction may be carried out in the absence of a catalyst, but the reaction rate is found to be significantly higher when use is made of catalysts, such as pyridine, phosphines, or chromium (III) salts. The catalyst may be used in a concentration of 0.01–0.1%, calculated on the solid ingredients. Polymerization of the (meth)acryloyl compounds during this esterification reaction must be prevented. For this reason it is advisable to employ polymerization inhibitors, such as hydroquinone, hydroquinone methyl ether, allyl substituted phenols, or phenothiazine. Such inhibitors can be used in concentrations of 0.01–2%, calculated on the solid ingredients.

The hydroxyl group-containing (meth)acrylate compounds utilized in the preparation of binders according to the invention, such as 2-hydroxyethyl (meth)acrylate, 2-hydroxypropyl (meth)acrylate, and 4-hydroxybutyl (meth)acrylate, subsequently reacted with cyclic anhydrides. This kind of reaction is described in EP 99 207 referred to hereinbefore at page 12, lines 27–32 and continuing at page 13, lines 1–15.

Preference is given to unsaturated cyclic anhydrides, such as maleic anhydride. The half ester groups thus formed may participate in the crosslinking reaction so as to form coatings having more favourable properties (hardness, resistance to solvents).

To obtain water-dilutable binders the free acid groups must be neutralized wholly or in part with a base. Suitable bases include metal hydroxides, more particularly and alkaline earth alkali metal hydroxides, ammonia, and tertiary amines.

The acrylate polymer, according to the present invention is built up from both epoxy acrylates and hydroxy acrylates.

If, as functional group-containing acrylate, only hydroxy acrylate is used, it is still possible in theory to prepare a (meth)acryloyl groups-containing binder resin. However, such a preparative process is not suitable for use in actual practice, as the preparation calls for a very high excess of (meth)acrylic acid or (meth)acrylic acid derivative (10 to 200%, relative to the OH groups) to obtain a proper conversion (sufficient built-in acryloyl groups). After the esterification reaction this excess has to be distilled off at elevated temperature ($\geq 100°$ C.) and high vacuum (<10 mbar). Since the distillate cannot be re-used, there will be a considerable loss of expensive raw materials. Moreover, a lengthy period of esterification is required, causing an increase in molecular weight, or even premature gelation of the binder in the esterification step as well as during high vacuum distillation.

If, as the functional group-containing acrylate, only epoxy acrylate is used, it is possible in theory to prepare a binder resin containing water-soluble half ester groups. The hydroxyl group formed by opening the epoxide ring may in theory be used for reaction with a cyclic anhydride to form a half ester. In such a case, however, there will be insufficient reaction with cyclic anhydrides during the preparation of the binder, requiring a lengthly reaction period and causing gelation of the polymer.

The polyfunctional crosslinking agents used may for instance be the mercaptans described in U.S. Pat. No. 4,571,420.

Alternatively, the polyfunctional crosslinking agents used may be amino compounds that have at least 1 primary amino group or at least 2 secondary amino groups. Highly suited for use are those compounds in which the primary amino groups have previously been blocked with ketones or aldehydes. These are described in European Patent Application No. 262 720, published on 1988-04-06. Preference is given to such crosslinking agents because they provide the most favourable combination of storage stability, curing rate, and film properties.

Other oligomeric or polymeric compounds that may or may not be water-soluble or water-dilutable can be added to the binder resin. In such case, the binder resin functions as a stabilizer for these additives. Particularly suitable additives include, for example, polyfunctional (meth)acryloyl groups-containing compounds of the type described in U.S. Pat. No. 4,251,597 and European Patent Specification No. 0 203 296; although acetoacetate groups-containing or epoxy groups-containing binders also may be considered. Use of additive compounds reduces the proportion of acid groups in the cured film, which will result in its displaying improved water resistance. Other non-water-dilutable binders, providing an improvement of other properties such as flexibility, can also be used in combination with the water-dilutable binder resin of the present invention. The amount of additive compounds which can be used in combination with the water dilutable resin of the present invention ranges from about 10% by weight to about 90% by weight of the combination, depending on the kind of additive compound used.

The aqueous composition may contain the conventional additives for coatings, glues, and inks, such as pigments and fillers.

A coating composition based on a binder according to the invention may be applied to a substrate in one of several usual ways. It may be used for all substrates that need to be coated. Application techniques and substrates are known to the man skilled in the art and need no further elucidation here.

The invention will be further described in the following, unlimitative examples. Acrylate polymer E is a comparative example which was prepared without use being made of a hydroxy-functional acrylate monomer.

EXAMPLES

EXAMPLES 1-5

Preparation of (Meth)acryloyl-containing Acrylate Copolymers A-E (Table 1)

(Meth)acryloyl-containing acrylate copolymer composition A

One thousand grams of xylene was changed into a reactor. This solvent was heated to boiling temperature, after which there were added, over a period of about 3 hours, 600.0 g of glycidyl methacrylate, 200.0 g of hydroxyethyl methacrylate, 474.4 g of lauryl methacrylate, 725.6 g of styrene, and a mixture of 300 g of xylene and 140.0 g of tert.butyl peroxy 3,5,5-trimethyl hexanoate (available under the trademark Trigonox 42 S from Akzo Chemie). The reaction mixture was kept at boiling temperature until a conversion of over 98% was reached. Next, 20.0 g of xylene were added.

The above-prepared copolymer, 284.3 g of acrylic acid, 37 g of hydroquinone monomethyl ether, and 0.9 g of chromium (III) 2-ethyl hexanoate (available under the trademark Cordova Accelerator AMC-2) were then mixed together and kept at a temperature of 120° C., with air being passed through, until the acid number of the mixture had dropped to below 2. Subsequently, 77 g of xylene were added.

(Meth)acryloyl-containing acrylate copolymers B-E were prepared in the same manner as described for copolymer A, but using the reactants as shown in Table 1.

EXAMPLES 6-11

Preparation of Water-dilutable, Crosslinkable Binder Resins 1-6 (Table 2)

Water-dilutable, crosslinkable binder resin 1

Six hundred grams of the reaction product of the copolymer A, 0.8 g of hydroquinone monomethyl ether, 0.8 g of dibutyl tin oxide, and 21.3 g of maleic anhydride were then mixed together and kept at a temperature of 80° C., with air being passed through, until a potential acid number (in pyridine/water) of less than about 20.6 was reached.

Next, 177.2 g of Dowanol PM (methoxypropylene glycol) was introduced. Obtained was a 48.8%-solution of the water-dilutable, crosslinkable binder resin having a viscosity of 22 cPa.s, a colour of 125 Apha, and an acid number for the solution of 15.8. Water-dilutable, crosslinkable binder resins 2-6 were prepared in the same manner as described for binder resin 1, but using the reactants shown in Table 2.

EXAMPLE 12

Preparation of Blocked Amino Curing Agent 2 (Table 3)

Into a reactor under a nitrogen atmosphere, the following were successively introduced: 196.5 g of dimethylene triamine; 330 g of methyl isobutyl ketone; 131.6 of toluene; and 2.0 g of formic acid. The resulting mixture was heated to boiling temperature, the reaction water formed being removed by azeotropic distillation. After 20 hours, 53.9 g of water (99.8% of theory) had been collected.

The resulting solution was cooled to 60° C., whereupon there was added to it over a period of 2 hours a solution of 297.7 g of a diglycidyl ether of bisphenol A (available under the trademark Epikote 828 from Shell Chemicals) in 446.5 g of toluene. This reaction mixture was kept at a temperature of 60° C. for about 4 hours. The resulting solution of the blocked amino compound was cooled and stored without purification.

EXAMPLES 13-17

Coating Compositions 1-5 (Table 4)

Coating compositions were prepared by intermixing stoichiometric amounts of the water-dilutable, crosslinkable binder resins of Table 2 with the blocked amino compounds (Table 4).

The (meth)acryloyl compounds were neutralized with triethylamine in advance and then diluted with water. The pot life of these compositions (measured at 20° C. and expressed in hours) is also given in Table 3.

Following their preparation the compositions were applied to a steel panel (Bonder no. 120). The resulting coatings were tack-free, i.e. so hardened that after the number of hours given in Table 4 they were found to be thumb-proof.

The resistance to premium grade gasoline, methyl ethyl ketone, and water was determined after 7 days' drying at ambient temperature by placing on the coated panel a wad of cotton wool soaked in the solvent in question for 1 minute and then rating the coat, whereby 5 is immune from attack and 0 is such destruction of the coat as to remove it completely.

TABLE 1

| Composition | (Meth)acryloyl-containing acrylate copolymers | | | | |
| --- | --- | --- | --- | --- | --- |
| | A | B | C | D | E |
| GMA | 600 | 600 | 600 | 600 | 600 |
| HEMA | 200 | 200 | 300 | 300 | — |
| LMA | 474.4 | — | 457.2 | 515.8 | — |
| BA | — | 535.2 | — | — | 574.2 |
| Styrene | 725.6 | 664.8 | 642.8 | 584.2 | 825.8 |
| Tert.butylperoxy-3,5,5-trimethyl hexanoate | 140 | 140 | 140 | 140 | 140 |
| Xylene | 1397 | 1397 | 1397 | 1397 | 1564 |
| Acrylic acid | 284.3 | 284.3 | 284.3 | 284.3 | 264 |
| MEHQ | 3.7 | 3.7 | 3.7 | 3.7 | 3.7 |
| CR (III)2-ethyl hexanoate | 0.9 | 0.9 | 0.9 | 0.9 | 0.9 |
| Final constants | | | | | |
| Colour; apha | 200 | 200 | 150 | 250 | 150 |
| Visc.; cPa.s | 1262 | 388 | 2530 | 770 | 124 |
| Solids content; % | 62.8 | 62.5 | 61.7 | 64 | 58.8 |
| Acid no. for the solution | 1.9 | 1.1 | 1.0 | 1.2 | 2.0 |

TABLE 2

| Composition | Water-dilutable, crosslinkable binder resins 1-6 | | | | | |
| --- | --- | --- | --- | --- | --- | --- |
| | Resin | | | | | |
| | 1 | 2 | 3 | 4 | 5 | 6 |
| A | 600 | | | | | |
| B | | 600 | | | | |
| C | | | 600 | | | |
| D | | | | 600 | 600 | |
| E | | | | | | 600 |
| MEHQ | 0.8 | 0.8 | 0.8 | 1.8 | 1.8 | 0.8 |
| DBTO | 0.8 | 0.8 | 0.8 | 1.8 | 1.8 | 0.8 |
| MZA | 21.3 | 21.2 | 31.9 | 31.9 | — | 50.3 |
| HHPZA | — | — | — | — | 49.1 | — |
| DOWANOL PM | 177.3 | 175.6 | 187.8 | 187.8 | 205.0 | — |
| Final constants | | | | | | |
| Colour; apha | 125 | 175 | 125 | 225 | 250 | X[1)] |
| Visc.; cPa.s | 22 | 25.1 | 44 | 29.2 | 24.6 | X |
| Solids content; % | 48.8 | 49.4 | 49.8 | 49.9 | 51.6 | X |

TABLE 2-continued

Water-dilutable, crosslinkable binder resins 1-6

| Compo- | Resin | | | | | |
|---|---|---|---|---|---|---|
| sition | 1 | 2 | 3 | 4 | 5 | 6 |
| Acid no. for the solution | 15.8 | 15.8 | 24.2 | 23.1 | 23.4 | X |

[1] Polymer gelled during preparation

TABLE 3

(Blocked) amino compounds

| Curing agent | Composition |
|---|---|
| 1 | Laromin C-260/MIBK |
| 2 | DETA/MIBK/EPIKOTE 828 |

TABLE 4

Coating compositions

| Resin | Coating Composition | | | | |
|---|---|---|---|---|---|
| | 1 | 2 | 3 | 4 | 5 |
| 1 | x | x | | | |
| 2 | | | x | x | |
| 3 | | | | | x |
| Curing agent | | | | | |
| 1 | x | | x | | x |
| 2 | | x | | x | |
| Results | | | | | |
| Pot life (hours) | 1.5 | 0.1 | 2 | 0.2 | 2 |
| Tack-free (hours) | | <0.2 | 1 | <0.2 | 0.5 |
| Thumb-proof (hours) | | 0.5 | 2 | 0.5 | 0.75 |
| Resistance | | | | | |
| premium grade gasoline | 5 | 5 | 5 | 5 | 5 |
| MEK | 3 | 5 | 2 | 4 | 3 |
| water | 5 | 5 | 5 | 4–5 | 2 |
| Film thickness (μm) | 51 | 51 | 48 | 50 | 48 |

TABLE 5

Abbreviations used

| | |
|---|---|
| AA | Acrylic acid |
| AMC-2 | Cordova accelerator AMC-2 (chromium (III) 2-ethyl hexanoate) |
| BA | Butyl acrylate |
| DBTO | Dibutyl tin oxide |
| DETA | Diethylene triamine |
| DPM | DOWANOL PM (propylene glycol methyl ether) |
| EP 828 | EPIKOTE 828 |
| GMA | Glycidyl methacrylate |
| HEMA | Hydroxyethyl methacrylate |
| HHPZA | Hexahydrophthalic anhydride |
| Laromin | Laromin C 260 (3,3'-dimethyl-4,4-diaminodicyclohexyl methane) |
| LMA | Lauryl methacrylate |
| MEHQ | Hydroquinone monomethyl ether |
| MIBK | Methyl isobutyl ketone |
| MZA | Maleic anhydride |
| TEA | Triethylamine |
| T 42 S | Trigonox 42 S (tert. butylperoxy-3,5,5-trimethyl hexanoate) |

What is claimed is:

1. A water-dilutable, crosslinkable (meth)acrylate copolymer resin prepared by a method comprising the steps of:
   (a) reacting the following compounds or monomers to form a copolymer;
      (1) 5-70% by weight of one or more epoxy group-containing (meth)acrylate compounds;
      (2) 3-30% by weight of one or more hydroxy-functional (meth)acrylate compounds;
      (3) 0-92% by weight of one or more monomers copolymerizable with (1) or (2);
   (b) subsequent to step (a) converting at least a portion of the pendant epoxy groups to (meth)acryloyl groups using (meth)acrylic acid or a derivative thereof; and
   (c) subsequent to step (a) converting at least a portion of the pendant hydroxy groups originating from the hydroxy-functional (meth)acrylate compounds to half esters by reaction with a cyclic dicarboxylic acid anhydride and neutralizing at least a portion of the acid groups in said half esters to render the (meth)acrylate copolymer water-dilutable.

2. The copolymer resin of claim 1 wherein the compounds reacted to form said copolymer consist essentially of epoxy acrylates and hydroxy acrylates.

3. The copolymer of claim 1 wherein said cyclic dicarboxylic acid anhydride is an unsaturated anhydride.

4. The copolymer of claim 1 wherein the pendant groups comprising ethylenic unsaturation can be crosslinked by polyfunctional crosslinking agents.

5. A water-dilutable, crosslinkable acrylic copolymer binder having pendant therefrom:
   (i) groups comprising water-soluble half esters of a dicarboxylic acid; and
   (ii) olefinic groups which can be crosslinked,
said copolymer binder comprising the reaction product of:
   (a) a (meth)acrylate copolymer possessing pendant epoxy and hydroxyl groups, prepared from
      (1) 5-70% by weight of one or more epoxy group-containing (meth)acrylate compounds or monomers,
      (2) 3-30% by weight of one or more hydroxyl functional (meth)acrylate compounds, or monomers and
      (3) 0-92% by weight of one or more other addition-polymerizable monomers copolymerizable with (1) and (2); with
   (b) (meth)acrylic acid or an epoxy group-reactive derivative thereof, thereby resulting in activated unsaturated groups pendant from the (meth)acrylate copolymer; and then
   (c) a cyclic dicarboxylic acid anhydride, thereby resulting in acid groups pendant from the acrylic copolymer, wherein at least a portion of the pendant acid groups are neutralized to render the acrylic copolymer water-dilutable.

6. The copolymer binder of claim 5 wherein an unsaturated cyclic dicarboxylic acid anhydride is used to form said half esters.

7. The copolymer binder of claim 5 wherein acrylic acid is reacted with said (meth)acrylate copolymer to produce said activated unsaturated groups pendant therefrom.

8. The copolymer binder of claim 5 wherein said pendant groups containing activated unsaturation can be crosslinked by polyfunctional crosslinking agents.

9. The copolymer binder of claim 5 wherein the compounds or monomers reacted to form said (meth)acrylate copolymer consist essentially of epoxy acrylates and hydroxy acrylates.

* * * * *